United States Patent
Toncelli et al.

(10) Patent No.: US 12,503,396 B2
(45) Date of Patent: Dec. 23, 2025

(54) PROCESS FOR THE MANUFACTURE OF ARTICLES MADE OF CONGLOMERATE MATERIAL

(71) Applicant: BRETON S.P.A., Castello di Godego (IT)

(72) Inventors: Luca Toncelli, Bassano del Grappa (IT); Fabio Bassetto, Bolzano Vicentino (IT); Stefano Zeggio, Castagnole di Paese (IT)

(73) Assignee: BRETON S.P.A., Castello di Godego (IT)

( * ) Notice: Subject to any disclaimer, the term of this patent is extended or adjusted under 35 U.S.C. 154(b) by 95 days.

(21) Appl. No.: 18/257,824

(22) PCT Filed: Dec. 16, 2021

(86) PCT No.: PCT/IB2021/061822
§ 371 (c)(1),
(2) Date: Jun. 15, 2023

(87) PCT Pub. No.: WO2022/130297
PCT Pub. Date: Jun. 23, 2022

(65) Prior Publication Data
US 2024/0059821 A1    Feb. 22, 2024

(30) Foreign Application Priority Data

Dec. 18, 2020   (IT) .................. 102020000031514

(51) Int. Cl.
*C04B 26/06* (2006.01)
*B28B 1/08* (2006.01)
(Continued)

(52) U.S. Cl.
CPC ............. *C04B 26/06* (2013.01); *B28B 1/082* (2013.01); *C08F 222/1006* (2013.01); *C08K 3/36* (2013.01); *C08L 35/02* (2013.01)

(58) Field of Classification Search
CPC ...................................... C04B 26/06
See application file for complete search history.

(56) References Cited

U.S. PATENT DOCUMENTS

| 3,876,518 A | | 4/1975 | Borden et al. |
| 4,197,225 A | * | 4/1980 | Emmons ................. C04B 26/06 524/789 |

(Continued)

FOREIGN PATENT DOCUMENTS

| CN | 107177152 A | 9/2017 |
| EP | 786325 A1 | 7/1997 |

(Continued)

OTHER PUBLICATIONS

Machine translation of EP 3543264, retrieved from USPTO database Apr. 28, 2025 (Year: 2025).*

(Continued)

*Primary Examiner* — Timothy Kennedy
(74) *Attorney, Agent, or Firm* — Fredrikson & Byron, P.A.

(57) ABSTRACT

The present invention relates to a process for the manufacture of articles made of conglomerate material, more particularly in the form of slabs or blocks, starting from a mixture comprising an optionally expanded granulate of stone material or lithoid material, and a binder based on a resin obtained from acrylate vegetal oils. The present invention also relates to the articles thus obtained.

16 Claims, 1 Drawing Sheet

(51) Int. Cl.
  *C08F 222/10* (2006.01)
  *C08K 3/36* (2006.01)
  *C08L 35/02* (2006.01)

(56) References Cited

U.S. PATENT DOCUMENTS

| | | | | |
|---|---|---|---|---|
| 4,400,413 | A * | 8/1983 | Emmons | C08F 220/282 |
| | | | | 427/407.1 |
| 5,288,807 | A * | 2/1994 | Hinz | C08F 279/02 |
| | | | | 525/289 |
| 6,323,259 | B1 * | 11/2001 | Ikegami | C08F 285/00 |
| | | | | 523/201 |
| 6,451,910 | B1 * | 9/2002 | Koyanagi | C04B 26/06 |
| | | | | 524/425 |
| 6,815,517 | B2 * | 11/2004 | Burgel | C04B 26/06 |
| | | | | 526/217 |
| 9,051,447 | B1 | 6/2015 | Figovsky et al. | |
| 10,322,970 | B2 * | 6/2019 | Buergel | C08F 222/103 |
| 10,513,566 | B2 * | 12/2019 | Mody | C08F 20/04 |
| 10,913,829 | B2 * | 2/2021 | Mody | C08K 3/34 |
| 2003/0027900 | A1 * | 2/2003 | Burgel | C04B 26/06 |
| | | | | 524/492 |
| 2005/0043473 | A1 * | 2/2005 | Centner | C04B 26/06 |
| | | | | 524/556 |
| 2015/0252146 | A1 * | 9/2015 | Gaefke | C08G 59/1466 |
| | | | | 528/93 |
| 2016/0032169 | A1 * | 2/2016 | Chew | C09K 8/50 |
| | | | | 175/57 |
| 2016/0236983 | A1 * | 8/2016 | Buergel | C08F 222/103 |
| 2018/0371118 | A1 * | 12/2018 | Mody | C08L 33/066 |
| 2019/0256420 | A1 * | 8/2019 | Buergel | C04B 26/02 |
| 2019/0263978 | A1 * | 8/2019 | Mody | C08L 63/00 |

FOREIGN PATENT DOCUMENTS

| | | | | |
|---|---|---|---|---|
| EP | 1878712 | A1 | 1/2008 | |
| EP | 2027077 | B1 | 11/2018 | |
| EP | 3543264 | A1 * | 9/2019 | |
| GB | 1598780 | A * | 9/1981 | C04B 26/06 |
| IT | 1350446 | A1 | 11/2005 | |
| WO | 2006122892 | A1 | 11/2006 | |
| WO | WO-2017007322 | A1 * | 1/2017 | B29C 67/243 |

OTHER PUBLICATIONS

Zahng, P. et al. (2013). One-step acrylation of soybean oil (SO) for the preparation of SO-based macromonomers. Green Chem.. 15. 641-645. 10.1039/C3GC36961G., 5 pgs.

Zhang, P., et al., (2013). Effects of Catalyst Type and Reaction Parameters on One-Step Acrylation of Soybean Oil. ACS Sustainable Chemistry & Engineering. 2. 181187. 10.1021/sc400206t., 7 pgs.

Rana, A. et al., (2015). Synthesis and Characterization of Acrylated Epoxidized Flaxseed Oil for Biopolymeric Applications. International Polymer Processing Journal of the Polymer Processing Society. 30. 331-336. 10.3139/217.2961., 6 pgs.

International Patent Application No. PCT/IB2021/061822, International Search Report and Written Opinion mailed Apr. 11, 2022, 8 pages.

Behera, D. et al. "Synthesis, Characterization, and Kinetics Study of Thermal Decomposition of Epoxidized Soybean Oit Acrylate", Materials Science Centre, Indian Institute of Technology, Journal of Applied Polymer Science. 109. 2583-2590. 10.1002/app.28350., 8 pgs.

Italian Patent Application No. 102020000031514, Search Report and written opinion mailed Sep. 3, 2021, 20 pages.

* cited by examiner

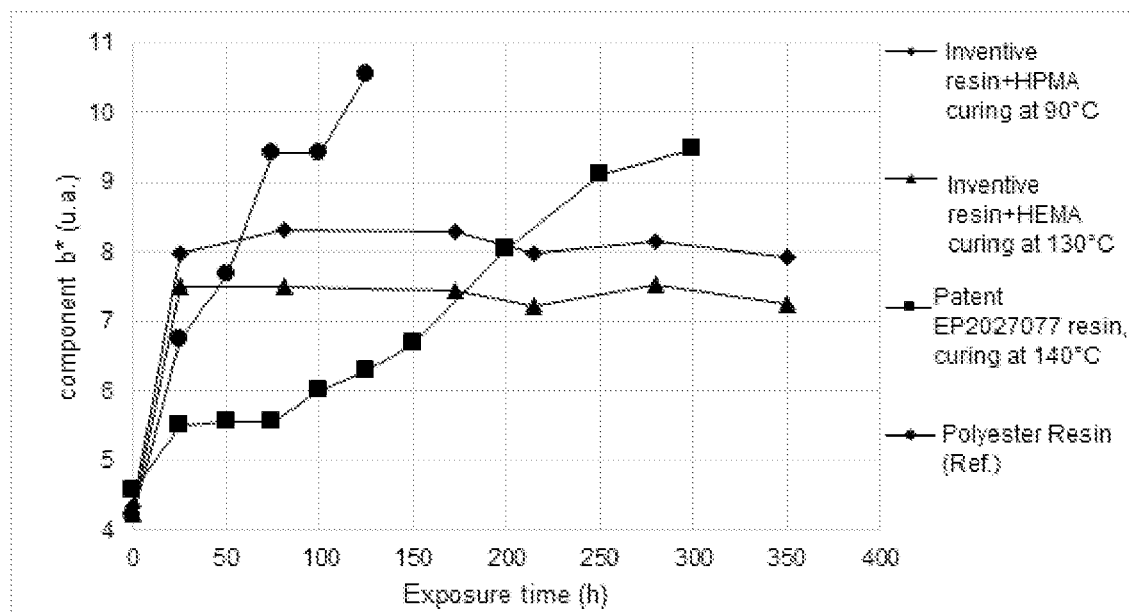

PROCESS FOR THE MANUFACTURE OF ARTICLES MADE OF CONGLOMERATE MATERIAL

RELATED APPLICATIONS

This application is a 35 U.S.C. 371 national stage filing from International Application No. PCT/IB2021/061822, filed Dec. 16, 2021, which claims priority to Italian Patent Application No. 102020000031514, filed Dec. 18, 2020. The entire contents of each of these applications is incorporated herein by reference in their entirety.

The present invention relates to a process for the manufacture of articles made of conglomerate material, more particularly in the form of slabs or blocks, starting from a mixture comprising an optionally expanded granulate of stone material or lithoid material, and a binder based on a resin obtained from acrylate vegetal oils. The present invention also relates to the articles thus obtained.

STATE OF THE ART

A process for the manufacture of compact and non-porous articles, preferably in the form of blocks and slabs, also known as Bretonstone® technology, has long been known, in which an initial mixture consisting of granulate material, having a selected particle size, and a curable resin-based binder is prepared.

Within the scope of the present description, the term "resin" or "curable resin" means a thermosetting polymer that, through a chemical crosslinking process, goes from a liquid state to a solid state.

Preferably, the granulate is made of optionally expanded stone material or lithoid material, and the resin is selected from the group comprising polyester, acrylic, epoxy, polyurethane, epoxy-acrylic resins, etc.

Alternatively or in addition, the mixture may contain a granulate made of expanded material, such as for example expanded glass or expanded ceramic/clay. The latter composition helps to reduce the specific weight of the finished article, which however results compact and non-porous.

From IT1350446, a process for the manufacture of compact and non-porous conglomerate articles starting from granulate of expanded material, such as for example expanded glass and expanded clay, is known.

The mixture is deposited on a temporary support or in a mould and subjected to a compression step under vacuum, with the accompanying application of a vibratory motion at pre-established frequency.

The resulting raw article is transferred to a curing step, at the end of which the article has the desired mechanical characteristics.

The resulting slab, optionally obtained from a block by sawing, is then sent to the finishing processes (calibration, smoothing, polishing, and the like).

The Bretonstone® technology is described for example in patent applications EP786325 and WO2006/122892, both of which are incorporated herein by reference.

The use of polyester, acrylic, epoxy, and polyurethane resins in the above technology makes it possible to obtain good quality articles with specific characteristics that distinguish them from other products on the market.

In particular, the most popular products on the market obtained with Bretonstone® technology are those made of conglomerate material containing polyester resins diluted with a solvent containing styrene, which allow to obtain important technical characteristics as well as being particularly economical.

A drawback of these known solutions is represented by the fact that the article obtained with a solvent-based polyester resin tends to yellow over time when subjected to a heating step or to ultraviolet rays.

It is apparent that this drawback has repercussions on the aesthetic characteristics of the articles, in particular for articles to be used as external coating of buildings because they are exposed to sunlight.

Another drawback of these known solutions is represented by the fact that the presence of styrene monomer as a reactive solvent contained in the resin, and therefore in the mixture, is a source of various environmental and health problems during the production of the articles, linked to its harmfulness and to the risk of explosion due to its high volatility.

The use of styrene in the manufacturing process, in fact, requires the presence of particularly sophisticated and expensive systems for collection and abatement of harmful vapors to comply with increasingly stringent regulations.

Furthermore, in the case of two-component resins, which however have a cost about four times the cost of polyester resins and makes them not convenient from an economic point of view, there is the further drawback deriving from the fact that these resins tend to cure even at room temperature before the completion of the article manufacturing process, and to settle on various parts of the plant creating fouling.

This drawback requires frequent plant maintenance and therefore results in an extension of the overall production times with a consequent increase in production costs.

In order to at least partially overcome these drawbacks, processes have been developed for the manufacture of articles made of conglomerate material that use resins different from those mentioned above, for example resins deriving from ecological and/or renewable raw materials, in particular of vegetable origin, and styrene free.

An example of these processes is described in the patent EP2027077, which involves the use of a resin formed by reaction between at least one epoxidized triglyceride and at least one carboxylic anhydride. The process described in the patent EP2027077 involves the use of a resin curing temperature of about 140° C.

In the field of manufacturing articles according to Bretonstone® technology, it is therefore apparent the need to make available new resins deriving from ecological and/or renewable raw materials, in particular of vegetable origin, while maintaining unchanged the mechanical and aesthetic characteristics of the articles obtainable by using commonly employed resins, for example polyester resins, but at the same time eliminating the presence of styrene in the mixture.

SUMMARY OF THE INVENTION

One object of the present invention is to provide a resin that avoids the use of styrene as a reactive solvent in an alternative way to patent EP2027077.

A further object of the present invention is to manufacture articles according to the Bretonstone® technology with reduced degradation in the event of exposure to atmospheric agents (in particular yellowing due to UV rays from the sun).

A further object of the present invention is to allow the manufacture of articles using a resin curing temperature lower than that used in the patent EP2027077, i.e. lower than 140° C.

A further object of the present invention is to produce a resin having a cost that does not differ much from the fairly low cost of the polyester resin.

In particular, the main object of the present invention is the manufacturing of articles and implementing a process for the manufacture of such articles according to the Bretonstone® technology and other known technologies which maintain the mechanical and aesthetic characteristics obtainable using the previously known binding resins, for example polyester resins, but also resistant to yellowing due to exposure to UV rays.

The main objects described above are achieved with a process for the manufacture of an article made of conglomerate material according to claim 1 and with an article thus obtained.

DESCRIPTION OF THE FIGURES

FIG. 1. Comparison of the degree of yellowing upon exposure to UV rays of composite stone articles prepared with the resin according to the present invention compared to those obtained using the polyester resin or the resin of the patent EP2027077.

DEFINITIONS

Unless otherwise defined, all terms of the art, notations, and other scientific terms used herein are intended to have the meanings commonly understood by those skilled in the art to which this description belongs. In some cases, terms with meanings that are commonly understood are defined herein for clarity and/or ready reference; therefore, the inclusion of such definitions in the present description should not be construed as being representative of a substantial difference with respect to what is generally understood in the art.

The terms "approximately" and "about" used in the text refer to the range of the experimental error that is inherent in the execution of an experimental measurement.

The terms "comprising", "having", "including" and "containing" are to be intended as open-ended terms (i.e., meaning "comprising, but not limited to"), and are to be considered as a support also for terms such as "consist essentially of", "consisting essentially of", "consist of", or "consisting of".

The terms "consists essentially of", "consisting essentially of" are to be intended as semi-closed terms, meaning that no other ingredients affecting the novel features of the invention are included (optional excipients may therefore be included).

The terms "consists of", "consisting of" are to be intended as closed terms.

The term "room temperature" refers to a temperature comprised between 20° C. and 25° C.

DETAILED DESCRIPTION OF THE INVENTION

For the purposes of the present invention, a liquid acrylic resin is described, which is obtained by mixing acrylate vegetable oils and reactive solvents other than styrene, and therefore not low boiling.

Vegetable oils are mainly made of triglycerides consisting mainly of monounsaturated fatty acids (palmitoleic, oleic, gadoleic acids) or polyunsaturated acids (linoleic, linolenic acids). They are liquid at room temperature and are of vegetable origin (olive, linseed, soybean, corn oils).

The acrylate vegetable oils usable in the present invention belong to two different families:

1) Epoxidized-acrylate oils in which the natural triglyceride constituting the vegetable oil undergoes a first epoxidation reaction in which the C—C double bonds are oxidized to epoxy groups. The following reaction scheme shows as an example soybean oil, in which the naturally occurring double C—C bonds are oxidized with hydrogen peroxide/formic acid into reactive epoxy groups, thus generating epoxidized soybean oil:

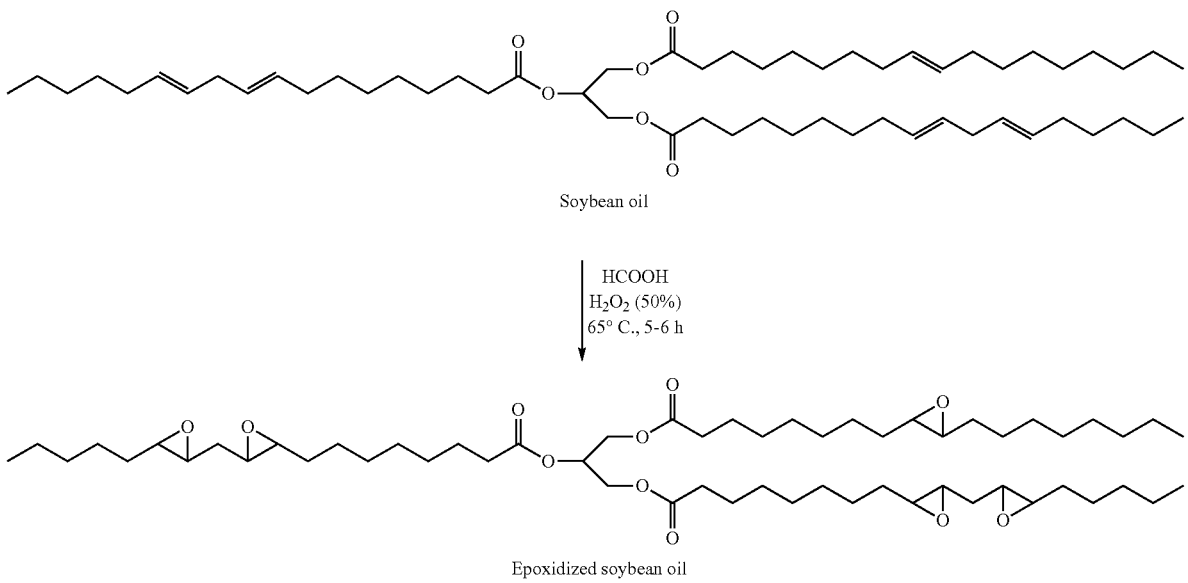

Soybean oil

HCOOH
H$_2$O$_2$ (50%)
65° C., 5-6 h

Epoxidized soybean oil

The epoxidized oil subsequently undergoes a second acrylation reaction in which the epoxy groups are converted into acrylic groups, thus generating vicinal hydroxy groups, as in the following reaction scheme:

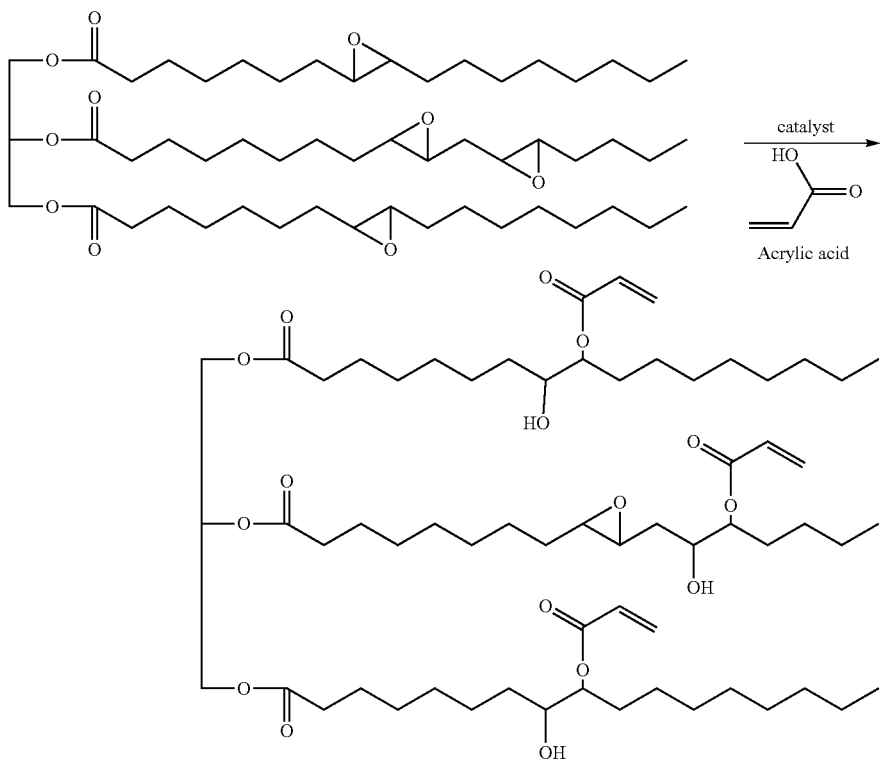

In particular, the second reaction scheme highlights two details: the first, as already mentioned, is the presence of a vicinal geminal hydroxy group; the second is the presence of residual epoxy groups, indicating that the reaction with acrylic acid may have yields lower than 100%.

The presence and the intra/intermolecular interaction of the —OH groups cause an increase in the dynamic viscosity of the epoxidized-acrylate oil to values of 20,000÷25,000 mPa·s. In composite technology, a viscosity of around 300÷600 mPa·s is often required to allow effective mixing between resin and filler (for example carbon fibers or solids such as quartz or marble granules).

It is therefore necessary to dilute such a product with low viscosity monomers in order to allow the simultaneous crosslinking reaction.

For the purposes of the present invention, the following epoxidized-acrylate oils may be used (indicated as not limiting examples): epoxidized-acrylate soybean oil, epoxidized-acrylate linseed oil, epoxidized-acrylate hemp seed oil.

Synthesis examples for the preparation of epoxidized acrylate oils are reported herein by reference [1,2,3].

2) Acrylate oils. In this case, the vegetable oil is directly treated with acrylic acid resulting in the formation of acrylate oil, as in the following reaction scheme:

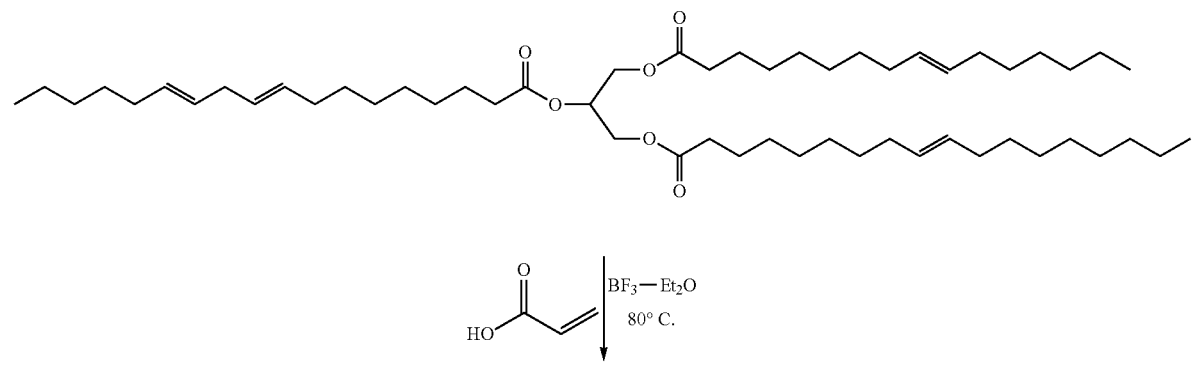

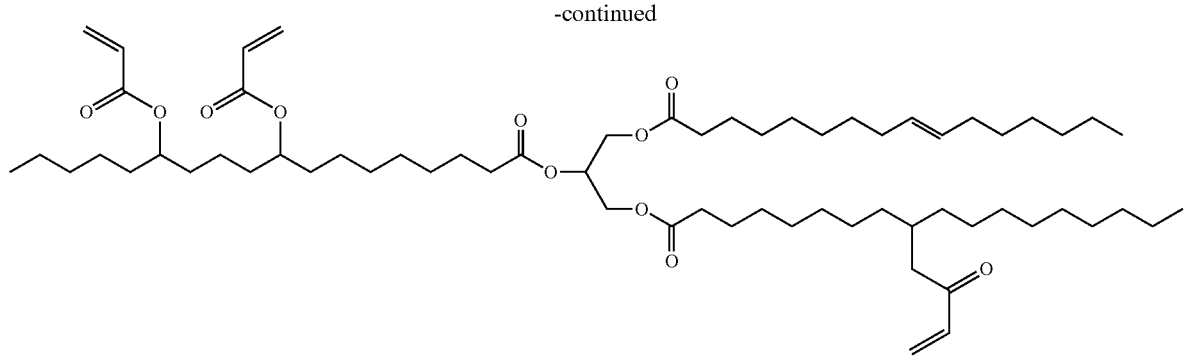

In this case, the acrylate oil does not have geminal hydroxy groups, so the viscosity is lower than epoxidized acrylate oils and equal to about 10,000÷15,000 mPa·s.

For the purposes of the present invention, the following acrylate oils may be used (indicated as not limiting examples): acrylate soybean oil, acrylate linseed oil, acrylate hemp oil.

Synthesis examples for the preparation of acrylate oils are reported herein for reference [4,5].

The monomers usable as reactive solvents in the present invention belong to the group of acrylates, and some non-limiting examples are listed below: acrylic acid, methacrylic acid, tricyclodecanedimethanol diacrylate, tricyclodecanedimethanol dimethacrylate, isobornyl acrylate, isobornyl methacrylate, 1,6-hexanediol diacrylate, 1,6-hexanediol dimethacrylate, 1,4-butanediol dimethacrylate, 1,4-butanediol diacrylate, triethylene-glycol-dimethacrylate, triethylene-glycol-diacrylate, trimethylolpropane-triacrylate, trimethylolpropane-tri methacrylate, polyethylene-glycol-dimethacrylate, polyethylene-glycol diacrylate, methoxy polyethylene glycol-methacrylate, methoxy polyethylene glycol-acrylate, polyethylene-glycol dimethacrylate, polyethylene-glycol diacrylate, 1,4-butanediol-diacrylate, hydroxy-propyl-methacrylate, hydroxy-propyl-acrylate, hydroxy-ethyl-methacrylate, hydroxy-ethyl-acrylate, hydroxy-butyl-methacrylate, hydroxy-butyl-acrylate, acrylic anhydride, and mixtures thereof.

The monomers are mixed with epoxidized acrylate oil or with acrylate oil until reaching a dynamic viscosity value suitable for the use of the final resin as a binder in composite materials. Assuming, for example, the need to dilute the epoxidized-acrylate soybean oil, whose initial viscosity is of about 20,000÷25,000 mPa·s at room temperature, with hydroxy-propyl-methacrylate (viscosity of about 9 mPa s), a resin containing about 33-37% by weight of monomer having a viscosity of 400÷600 mPa·s at room temperature is obtained.

This process of mixing/lowering the final viscosity of the resin can be replicated for each acrylic monomer and epoxidized-acrylate oil or acrylate oil listed above, in order to obtain the required viscosity of about 300÷600 mPa·s.

To increase the degree of crosslinking of the resin (with improvements in the post-curing physical-mechanical properties of the same, for example hardness) it is advantageous to add particular oligomeric additives with multiple acrylic functionalities (which, when cured, form solids with a high glass transition temperature), for example, diacrylate aliphatic urethanes, triacrylate aliphatic urethanes, hexacrylate aliphatic urethanes, polybranched acrylate polyesters, epoxy-acrylates. and mixtures thereof.

Advantageously, the resin for the purposes according to the invention, suitably added with homogeneous catalysts based on metal complexes and peroxide initiators, if heated, completely replaces the polyester resin without any modifications of the plant where it is used.

The resin undergoes a hot crosslinking reaction according to a radical polymerization mechanism by adding a suitable radical initiator (for example, of the peroxidic type, preferably based on tert-butyl-peroxy-3,5,5-trimethylhexanoate or tert-butyl-peroxy-benzoate), and a homogeneous catalyst, preferably based on metal complexes, more preferably based on cobalt.

Since the propagation mechanism is of the radical type, it is also possible to use initiators other than peroxides. For example, compounds in which the C—C bond is strongly destabilized by substituents derived from tetraphenyl-ethane or those in which the N—N bond is destabilized such as in the compound 2,2'-azobis-(2-methylpropionamidine) dihydrochloride or acid 4,4'-azobis-(4-cyanopentanoic).

It is possible to use proactive compounds of cobalt salts (also called co-catalysts), for example, potassium 2-ethylhexanoate which allows, under the same curing conditions, to reduce the % of Co in the finished article.

Preferred examples of peroxide initiators that can be used in the present invention and are commercially available are the products Trigonox®42PR (90% mixture of activated tert-butyl-peroxy-3,5,5-trimethylhexanoate and 10% acetylacetone), Trigonox®93 (mixture of 80% tert-butyl-peroxy-benzoate and 20% acetyl-acetone) and Trigonox®61 (mixture of methyl-ethyl-ketone peroxide and acetylacetone peroxide in solvents).

Preferred examples of commercially available homogeneous catalysts that can be used in the present invention are the products AcceleratorNL51 PN® (a 6% solution of cobalt 2-ethyl-hexanoate), 15% Potassium Hex-Cem® (Potassium 2-ethylhexanoate with 15% by weight of K dissolved in diethylene diglycol), ECOS ND15® (polymeric complex of cobalt in 2-methyl-2,4-pentanediol).

The trend of the resin temperature over time, during the curing process, is similar to that of thermosetting polymers, and in particular of unsaturated polyester resins, under the same curing cycle conditions. In general, the maximum temperature reached is between 180-200° C. with a "time-to-peak" between 15÷20 minutes.

At the end of curing, an amber-colored solid without cracks, which shows interesting physical-mechanical properties, is obtained.

Advantageously, this particular resin does not tend to yellow, both during the catalytic curing step at a predetermined temperature, and above all when it is exposed to UV radiation.

The resin for the purposes according to the invention may be used in all composite materials where the use of a structural resin that heat cures fairly rapidly is required, for example stone agglomerates.

The resin for the purposes according to the invention can also be added with a silane having the function of increasing adhesion to the inert material.

Silanes suitable for the resin of the present invention may be selected from the group comprising trimethoxysilanes, or more generally trialkoxysilanes, with general formula $Si(OR)_n$ where n=3 and R is a $C_1$-$C_6$ alkyl.

A thermosetting binder consisting of the above-described resin is also described.

An object of the present invention consists of a process for the manufacture of an article made of conglomerate material, preferably in the form of a slab or a block, comprising the following steps:
  a) preparation of an initial mixture containing an optionally expanded granulate of stone material or lithoid material, and a binding resin obtained by reacting at least one epoxidized-acrylate or acrylate vegetal oil and at least one acrylate monomer, and characterized in that it has a viscosity comprised between about 300 and 600 mPa·s, at 20-25° C.;
  b) deposition of said mixture on a temporary support or in a mould;
  c) compaction of said mixture;
  d) curing of said binding resin at a temperature comprised between 80° C. and 130° C. to obtain said conglomerate material.

The binding resin used in the process according to the invention is according to the previous description.

The granulate material used for the preparation of the initial mixture may contain granules of expanded glass or expanded ceramic/clay.

In a frequently adopted embodiment, the compaction step c) is carried out by vacuum vibro-compression of the mixture under vacuum.

Preferably, the curing temperature is comprised between about 110° C. and 120° C. Preferably, the mould or the temporary support are of sizes corresponding to those of the article to be obtained.

A further object of the present invention is represented by an article made of conglomerate material, preferably in the form of a slab or a block, comprising:
  a granulate of stone material or lithoid material, optionally expanded;
  a binding resin according to the preceding description.

A further object of the present invention is represented by the article obtainable according to the process of the present invention.

The conglomerate can be made starting from an aggregate of inert material in the form of expanded, and therefore light, granules having a selected granulometric scale. The granules can be made of expanded glass or expanded ceramic/clay.

Conveniently, the article in the form of a slab is obtained starting from a mixture deposited in a mould or on a temporary support.

However, the article can also be made in the form of a block, using a formwork instead of a mould for depositing the mixture. In this case the slabs can be obtained by subsequent sawing of the block in a known way.

Preferably, the binding resin is present in the article in an amount by volume equal to about 10-30% with respect to the volume of the article.

From the foregoing it is now clear how the acrylic resin, the article made of conglomerate material and the manufacturing process of the article according to the invention allow to advantageously achieve the intended objects.

Naturally, the above description of embodiments that apply the innovative principles of the present invention was provided by way of example of such innovative principles and should therefore not be considered as limiting the scope of protection claimed herein.

In particular, the characteristics of the solutions shown may even be used only partially according to specific needs.

The following examples are intended to further illustrate the invention without however limiting it.

EXAMPLES

Example 1 (Epoxidized-Acrylate Soybean Oil with HPMA)

100 g of epoxidized-acrylate soybean oil are mixed with hydroxy-propyl methacrylate (HPMA) to obtain a final liquid (resin) containing 37.2% by weight of monomer and having a viscosity equal to 425 mPa·s at room temperature. This resin is additivated by mixing with 2.0 phr of Trigonox42PR®, 0.2 phr of AcceleratorNL51P® and placed in a thermostatic bath at 80° C. A time-to-peak equal to 15 min and 20 s and a maximum temperature of 188° C. are measured. The hardness of the cured resin measured according to the ShoreD scale is equal to 46.

Example 2 (Epoxidized-Acrylate Soybean Oil with HPMA and Polybranched Polyester Acrylate)

100 g of epoxidized soybean oil acrylate are mixed with hydroxy-propyl methacrylate (HPMA) to obtain a final liquid (resin) containing 37.2% by weight of monomer and having a viscosity equal to 425 mPa·s at room temperature. To this mixture, about 20 g of polybranched acrylate polyester oligomer (example CN2303EUe Sartomer) are added. This resin is additivated by mixing with 2.0 phr of Trigonox42PR®, 0.2 phr of AcceleratorNL51P® and placed in a thermostatic bath at 80° C. A time-to-peak equal to 12 min and 10 s and a maximum temperature equal to 201° C. is measured. The hardness of the cured resin measured according to the ShoreD scale is equal to 52.

Example 3 (Epoxidized-Acrylate Linseed Oil with HPMA)

100 g of epoxidized-acrylate linseed oil are mixed with hydroxy-propyl methacrylate to obtain a final liquid (resin) containing 53.2% by weight of monomer having a final viscosity equal to 435 mPa·s. This resin is additivated by mixing with 2.0 phr of Trigonox42PR® and 0.2 phr of AcceleratorNL51P® and placed in a thermostatic bath at 80° C. A time-to-peak equal to 16 min and 20 s and a maximum temperature of 197° C. are measured.

Example 4 (Epoxidized-Acrylate Soybean Oil with HEMA and Variants)

100 g of epoxidized-acrylate soybean oil are mixed with hydroxy-ethyl methacrylate (HEMA) to obtain a final liquid (resin) containing 34.5% by weight of monomer and viscosity of 449 mPa·s at 23° C. This resin is additivated by mixing with 2.0 phr of Trigonox42PR® and 0.2 phr of AcceleratorNL51P® and placed in a thermostatic bath at 80° C. A time-to-peak of 17 min and 10 s and a maximum temperature of 189.3° C. are measured.

By keeping constant everything except the composition of the peroxidic initiator (80% of activated tert-butyl-peroxy-3,5,5-trimethylhexanoate and 20% of acetyl-acetone) the crosslinking reaction can be accelerated with a time-to-peak equal to 12 min and 20 s and a maximum temperature of 184.5° C.

By keeping everything constant, except the monomer type (i.e. 1:1 mass/mass mixture of hydroxy-ethyl methacrylate and hydroxy-ethyl-acrylate), the crosslinking reaction can be accelerated with a time-to-peak equal to 15 min and 15 s and a maximum temperature of 206.2° C.

Example 5 (Bretonstone® with Acrylic Resin-HPMA and Polybranched Acrylate Polyester Additive)

266 g of epoxidized-acrylate soybean oil were mixed with 158 g of hydroxy-propyl methacrylate and 52 g of polybranched polyester acrylate. 0.85 g of AcceleratorNL51P®, 8.5 g of Trigonox42PR®, 4.24 g of 3-methacryloxypropyltrimethoxy-silane and 4.24 g of 3-methacryloxymethyl-trimethoxy-silane were added. The mixture was mixed for at least 15 minutes at room temperature.

The resin thus obtained was poured into a mixture of 3,255 g of quartz granulate having a size of between 0.1 and 1.2 mm and 1,330 g of ventilated powders having an average particle size of between 0.005 and 0.025 mm. The mixture thus obtained is stirred, poured into a mould, and finally compacted by vibro-compression, cured at 110° C. for 1 hour and polished according to the standard Bretonstone® method. The article thus manufactured was subjected to bending, water absorption and resistance to deep abrasion tests. It was thus found that: it has a flexural strength of approximately 48-50 MPa; if subjected to water absorption for at least 24 hours, it has a weight increase of 0.03%; in the deep abrasion test it generates a mark whose length is 27 mm long.

Example 6 (Polyester Resin with Styrene) (Comparative)

100 g of unsaturated polyester resin containing 35.1% by weight of solvent-styrene monomer are additivated with 2.0 phr of Trigonox42PR® and 0.2 phr of AcceleratorNL51P®. The mixture is controlled by placing it in a thermostatic bath at 80° C. A time-to-peak of 10 min and 20 s and a maximum temperature of 188° C. are measured.

The resin thus obtained was poured into a mixture of 3,255 g of quartz granulate having a size of between 0.1 and 1.2 mm and 1,330 g of ventilated powders having an average particle size of between 0.005 and 0.025 mm. The mixture is stirred, poured into a mould, and finally compacted by vibro-compression, cured and polished according to the standard Bretonstone® method.

The article thus obtained was subjected to bending, water absorption and resistance to deep abrasion tests. It was thus found that: it has a flexural strength of approximately 50-52 MPa; if subjected to water absorption for at least 24 hours, it has a weight increase of 0.03%; in the deep abrasion test it generates a mark whose length is 27 mm long.

Surprisingly, the inventors have found that the acrylic resin of the present invention has considerable advantages over the prior art.

1. The resin curing agent is an acrylic monomer that is much less volatile than styrene, as shown in Table 1 below:

TABLE 1

| Monomer | Vapor pressure, mmHg (20° C.) |
|---|---|
| Styrene | 5 |
| HEMA | 0.01 |
| HPMA | 0.05 |

Therefore, during the vacuum vibro-compression step of the Bretonstone® process, the acrylic monomer evaporates from the mixture much less than styrene, ensuring its processability without the risk of it becoming drier and more difficult to compact.

2. The resin curing agent is an acrylic monomer that is not sensitive to air humidity, unlike the resin monomers referred to in patent EP2027077 (dicarboxylic anhydrides). The latter, in fact, with humidity form the respective dicarboxylic acids, which are not very soluble and crystallize in the resin, generating defects in the final article. To work with such a resin, it is therefore necessary to condition the environment in which the mixing and conveying system operates, with pre-established limits of temperature and humidity, with a consequent increase in costs.

3. The cost of the resin for the purposes of the present invention is lower than the costs of the resin of patent EP2027077 (dicarboxylic anhydrides) and only slightly higher than a good polyester resin with styrene.

4. The resin can be cured at a lower temperature than that of the resin of patent EP2027077 (dicarboxylic anhydrides) (max 120° C. compared to 140° C.) with consequent benefits.

5. The percentage of raw material deriving from vegetable oils of the resin for the purposes according to the present invention is higher than that of the resin of patent EP2027077 (dicarboxylic anhydrides) (about 65% by weight with respect to 50% by weight). This makes the resin and the final product more attractive from an environmental point of view.

6. The articles prepared with the resin according to the present invention show a clear improvement on the veterometer with respect to the articles obtained using the polyester resin or the resin of the patent EP2027077 (dicarboxylic anhydrides).

In particular, if the white-colored articles, obtained with the Bretonstone® process with the different resins, are exposed to the veterometer according to the ASTM G154 standard, cycle n° 3 of the table shown therein X2.1 and then the color components of these exposed surfaces are measured using the colorimeter according to CIELab scheme, the graph shown in FIG. 1 is obtained.

The exposure time is shown on the abscissa, the component b*, which according to CIELab, indicates the intensity of the yellow color, on the ordinate. The graph compares the curves of the references prepared with the standard polyester resin or with the resin of the patent EP2027077 (dicarboxylic anhydrides) which show, at long exposure times, b* values greater than the respective ones obtained with the resin according to the present invention with HEMA or HPMA monomers. Advantageously, the samples prepared with the acrylic resin of the invention show less degradation.

BIBLIOGRAPHY

[1] U.S. Pat. No. 3,876,518 Borden et al, Acrylated epoxidized soybean oil amine compositions and method of curing the same (1975).

[2] Rana et al. Synthesis and Characterization of Acrylated Epoxidized Flaxseed Oil for Biopolymeric Applications Bibliography DOI 10.3139/217.2961, Intern. Polymer Processing (2015) 3; 331-336.

[3] Behera et al. Synthesis, Characterization, and Kinetics Study of Thermal Decomposition of Epoxidized Soybean Oil Acrylate. Journal of Applied Polymer Science, Vol. 109, 2583-2590 (2008).

[4] Zhang et al. One-step acrylation of soybean oil (SO) for the preparation of SO-based macromonomers Green Chem., 2013, 15, 641.

[5] Zhang et al. Effects of Catalyst Type and Reaction Parameters on One-Step Acrylation of Soybean Oil ACS Sustainable Chem. Eng. 2014, 2, 181-187.

The invention claimed is:

1. A process for the manufacture of articles made of conglomerate material, comprising the following steps:
   a) preparation of an initial mixture containing an optionally expanded granulate of either stone material or lithoid material, and a binding resin obtained by reacting at least one epoxidized-acrylate or acrylate vegetal oil and at least one acrylate monomer, and characterized in that the mixture has a viscosity comprised between about 300 and 600 mPas, at 20-25° C.;
   b) deposition of said mixture on a temporary support or in a mould;
   c) compaction of said mixture following said deposition;
   d) curing of said binding resin at a temperature between 80° C. and 130° C. to obtain said conglomerate material.

2. The process according to claim 1, characterized in that said at least one epoxidized-acrylate vegetal oil is selected from the group consisting of epoxidized-acrylate soybean oil, epoxidized-acrylate linseed oil, and epoxidized-acrylate hemp seed oil.

3. The process according to claim 1, characterized in that said at least one acrylate oil is selected from the group consisting of acrylate soybean oil, acrylate linseed oil, and acrylate hemp seed oil.

4. The process according to claim 1, characterized in that said at least one acrylate monomer is selected from the group consisting of acrylic acid, methacrylic acid, tricyclodecanedimethanol diacrylate, tricyclodecanedimethanol dimethacrylate, isobornyl acrylate, isobornyl methacrylate, 1,6-hexanediol diacrylate, 1,6-hexanediol dimethacrylate, 1,4-butanediol dimethacrylate, 1,4-butanediol diacrylate, triethylene-glycol-dimethacrylate, triethylene-glycol-diacrylate, trimethylolpropane-triacrylate, trimethylolpropane-trimethacrylate, polyethylene-glycol-dimethacrylate, polyethylene-glycol-diacrylate, methoxy polyethylene glycol-methacrylate, methoxy polyethylene glycol-acrylate, polyethylene-glycol dimethacrylate, polyethylene-glycol diacrylate, 1,4-butanediol-diacrylate, hydroxy-propyl-methacrylate, hydroxy-propyl-acrylate, hydroxy-ethyl-methacrylate, hydroxy-ethyl-acrylate, hydroxy-butyl-methacrylate, hydroxy-butyl-acrylate, and mixtures thereof.

5. The process according to claim 1, characterized in that said binding resin is further added with a silane.

6. The process according to claim 1, characterized in that said binding resin is further added with at least one oligomer containing multiple acrylic functionalities, preferably selected from the group comprising diacrylate aliphatic urethanes, triacrylate aliphatic urethanes, hexacrylate aliphatic urethanes, polybranched acrylate polyesters, epoxyacrylates, and mixtures thereof.

7. The process according to claim 1, characterized in that said binding resin further comprises a peroxidic initiator and a homogeneous catalyst.

8. The process according to claim 7, characterized in that said peroxidic initiator is selected from a mixture of tert-butyl-peroxy-3,5,5-trimethylhexanoate and acetyl-acetone, a mixture of tert-butyl-peroxy-benzoate and acetyl-acetone, or a mixture of methyl-ethyl-ketone peroxide and acetylacetone peroxide, and said homogeneous catalyst is selected from a solution of cobalt 2-ethyl-hexanoate, a solution of potassium 2-ethylhexanoate or a polymeric complex of cobalt in 2-methyl-2,4-pentanediol, and mixtures thereof.

9. The process according to claim 1, characterized in that said step c) is performed by means of vibro-compression under vacuum.

10. The process according to claim 1, characterized in that said curing temperature is between about 110° C. and 120° C.

11. The process according to claim 1 wherein the articles are manufactured to be in the form of a slab or a block.

12. The process according to claim 2, characterized in that said at least one acrylate oil is selected from the group consisting of acrylate soybean oil, acrylate linseed oil, and acrylate hemp seed oil.

13. The process according to claim 2, characterized in that said at least one acrylate monomer is selected from the group consisting of acrylic acid, methacrylic acid, tricyclodecanedimethanol diacrylate, tricyclodecanedimethanol dimethacrylate, isobornyl acrylate, isobornyl methacrylate, 1,6-hexanediol diacrylate, 1,6-hexanediol dimethacrylate, 1,4-butanediol dimethacrylate, 1,4-butanediol diacrylate, triethylene-glycol-dimethacrylate, triethylene-glycol-diacrylate, trimethylolpropane-triacrylate, trimethylolpropane-trimethacrylate, polyethylene-glycol-dimethacrylate, polyethylene-glycol-diacrylate, methoxy polyethylene glycol-methacrylate, methoxy polyethylene glycol-acrylate, polyethylene-glycol dimethacrylate, polyethylene-glycol diacrylate, 1,4-butanediol-diacrylate, hydroxy-propyl-methacrylate, hydroxy-propyl-acrylate, hydroxy-ethyl-methacrylate, hydroxy-ethyl-acrylate, hydroxy-butyl-methacrylate, hydroxy-butyl-acrylate, and mixtures thereof.

14. The process according to claim 2, characterized in that said binding resin is further added with a silane.

15. The process according to claim 6, wherein the at least one oligomer containing multiple acrylic functionalities is selected from the group consisting of diacrylate aliphatic urethanes, triacrylate aliphatic urethanes, hexacrylate aliphatic urethanes, polybranched acrylate polyesters, epoxyacrylates, and mixtures thereof.

16. The process according to claim 7, wherein the peroxidic initiator and the homogeneous catalyst is based on metal complexes.

* * * * *